March 10, 1970  J. G. RICH  3,499,424
ROTARY INTERNAL COMBUSTION ENGINES
Filed Feb. 29, 1968  7 Sheets-Sheet 1
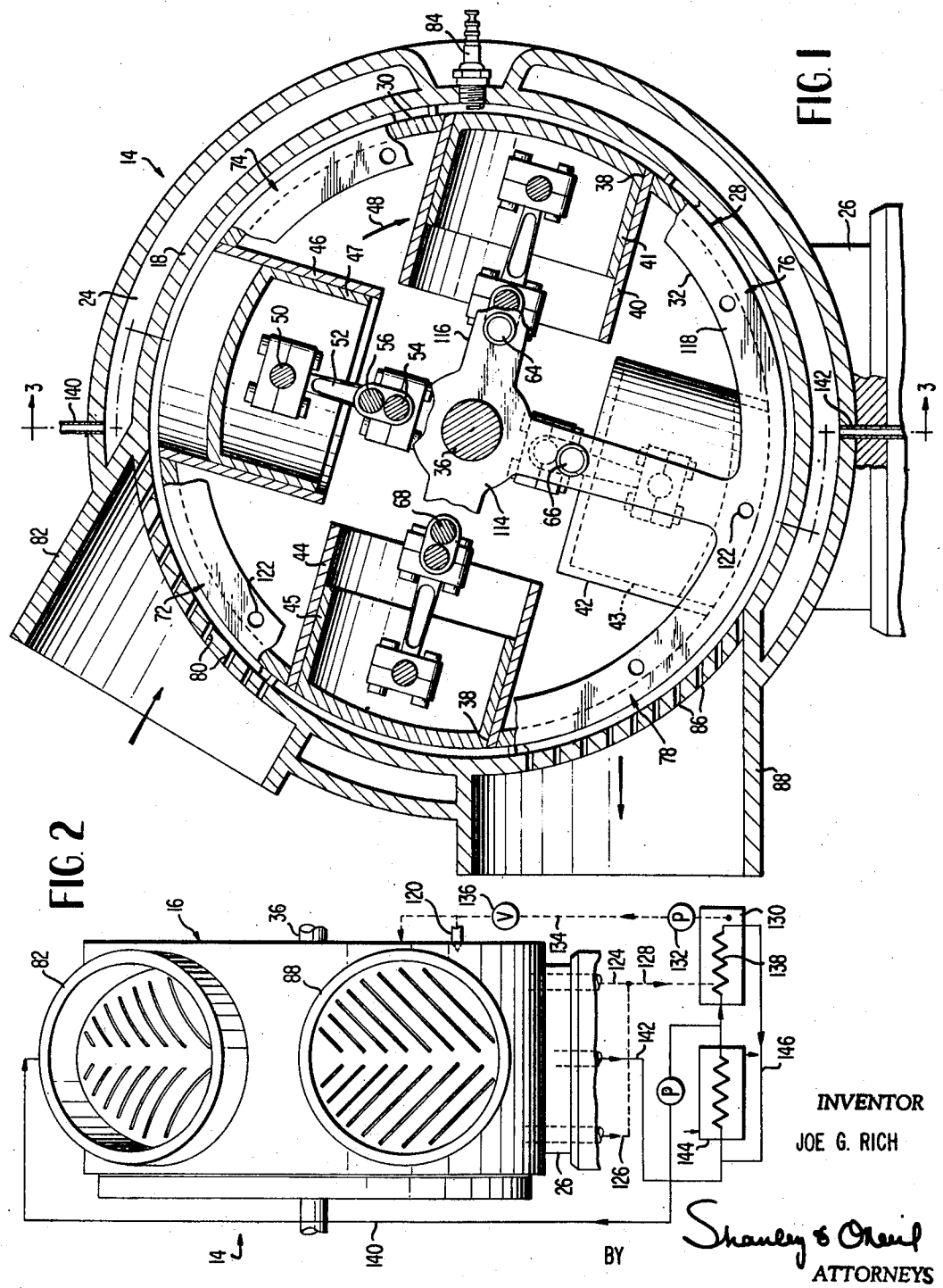
INVENTOR
JOE G. RICH
BY Shanley & O'Neil
ATTORNEYS March 10, 1970    J. G. RICH    3,499,424
ROTARY INTERNAL COMBUSTION ENGINES
Filed Feb. 29, 1968    7 Sheets-Sheet 2

March 10, 1970  J. G. RICH  3,499,424
ROTARY INTERNAL COMBUSTION ENGINES
Filed Feb. 29, 1968  7 Sheets-Sheet 3

March 10, 1970  J. G. RICH  3,499,424
ROTARY INTERNAL COMBUSTION ENGINES
Filed Feb. 29, 1968  7 Sheets-Sheet 4
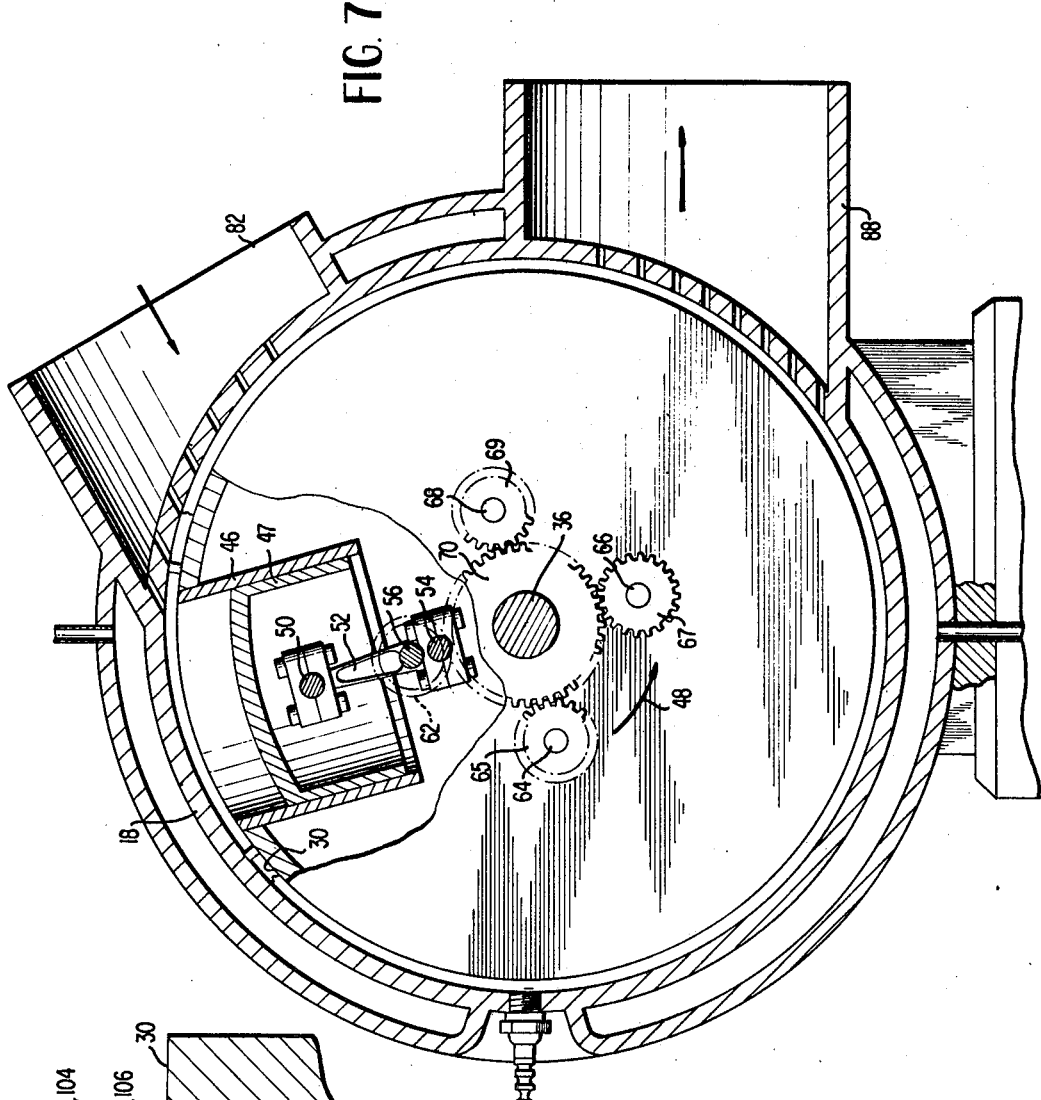
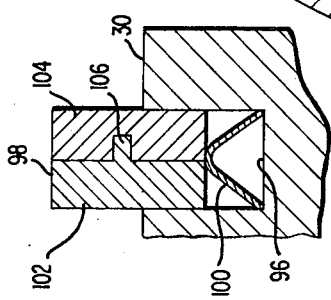

March 10, 1970 J. G. RICH 3,499,424
ROTARY INTERNAL COMBUSTION ENGINES
Filed Feb. 29, 1968 7 Sheets-Sheet 6

United States Patent Office 3,499,424
Patented Mar. 10, 1970

3,499,424
ROTARY INTERNAL COMBUSTION ENGINES
Joe G. Rich, 2996 NW. 62nd St.,
Miami, Fla. 33147
Filed Feb. 29, 1968, Ser. No. 709,306
Int. Cl. F02b 57/00
U.S. Cl. 123—44          16 Claims

ABSTRACT OF THE DISCLOSURE

Rotary internal combustion engines include a rotor mounted in a stationary housing. Four pistons are provided at 90° intervals around the rotor. Power from reciprocation of the pistons is transmitted to planetary gears which act against a fixed sun gear to rotate the rotor. An oil spring nozzle sprays cooling lubricant onto the cylinders as the rotor rotates. Annular sealing rings and longitudinal sealing strips on the rotor seal combustion areas from one another and from ambient.

BACKGROUND OF THE INVENTION

A wide variety of rotary internal combustion engines has been proposed in the prior art. However, the engines proposed heretofore have had some disadvantage or deficiency which prevented them from being entirely satisfactory. A need still exists for an improved internal combustion engine that is easy to manufacture, simple to construct and maintain, and delivers a relatively high power output for its size and weight. A main object of the invention is provision of an improved internal combustion engine to fill this need.

Among the problems encountered in the construction of rotary engines has been the difficulty of providing proper cooling, and of providing effective sealing of combustion areas from one another and from ambience. Another object of the invention is to provide a rotary combustion engine which overcomes these problems.

Other objects of the invention will appear from the following detailed description which, when considered in connection with the accompanying drawings, discloses two embodiments of the invention.

BRIEF DESCRIPTION OF THE DRAWINGS

In the drawings, where similar reference characters denote similar elements throughout the several views:

FIGURE 1 is a vertical cross-sectional view of one side of a rotary engine embodying the principles of the invention;

FIGURE 2 is a front elevational, partly schematic, view of the engine of FIGURE 1;

FIGURE 6 is an enlarged detail view on section line 6—6 of FIGURE 4;

FIGURE 7 is a view in vertical cross-section of the opposite side of the engine of FIGURE 1;

DESCRIPTION OF THE ILLUSTRATED EMBODIMENTS

Figure 3:
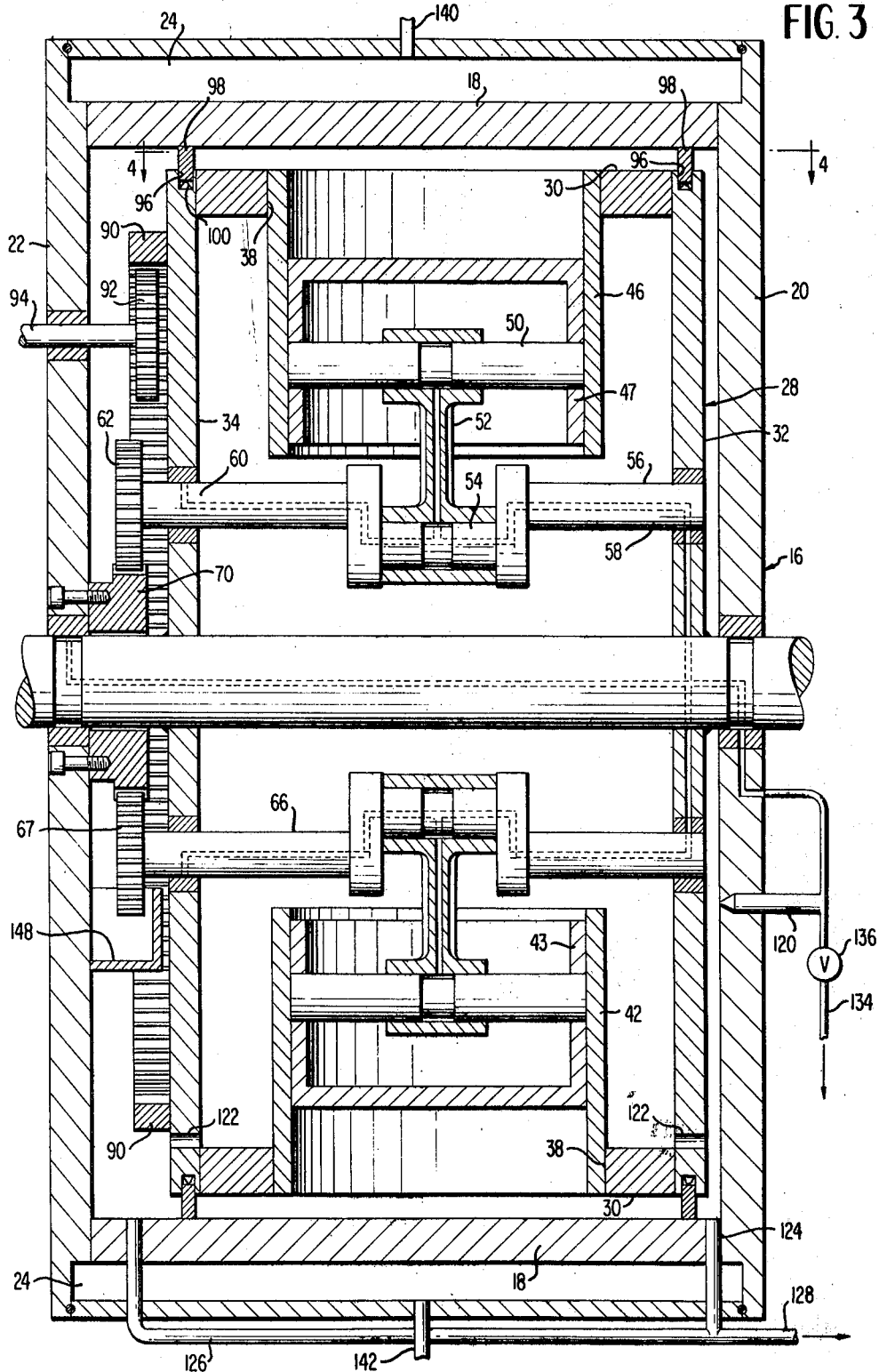
FIGURE 3 is a cross-sectional view on line 3—3 of FIGURE 1.

In FIGURES 1 and 2, a rotary engine generally indicated at 14 comprises a stationary housing generally indicated at 16. Housing 16 is circular, and includes a continuous side wall 18 and opposed end walls 20, 22 (FIGURE 3). A water cooling jacket or chamber 24 surrounds most of housing side wall 18. The assembly is carried by a base 26.

A circular rotor generally indicated at 28 is concentrically disposed in housing 16, and mounted for rotation within the housing. Rotor 28 includes a continuous peripheral side wall 30 opposing housing side wall 18. Rotor 28 also includes opposite end walls 32, 34. A cylindrical drive shaft 36 extends through the rotor and is fixed to rotor end walls 32, 34. This provides a rigid structure of great strength. Shaft 36 is rotatably mounted in bearings in housing end walls 20, 22. Shaft 36 has a longitudinal axis which is coincident with the axis of rotation of rotor 28.

Figure 4:
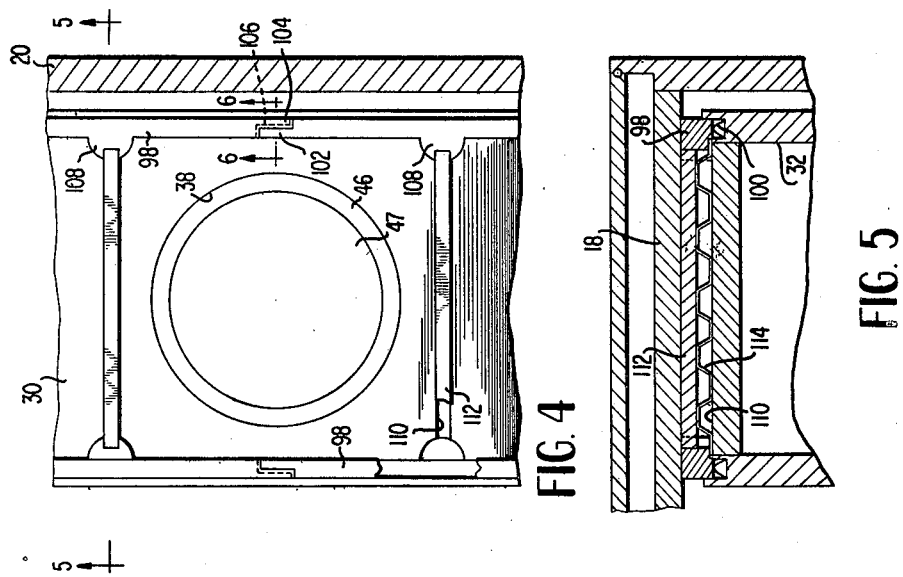
FIGURE 4 is a detail view on section line 4—4 of FIGURE 3.

Side wall 30 of rotor 28 has four circular apertures 38 (FIGURES 1, 3, 4) spaced at 90° intervals around the axis of the rotor. Four cylinders 40, 42, 44 and 46 are spaced at 90° intervals around the rotor axis. The cylinders extend radially inwardly from apertures 38.

Radially movable pistons 41, 43, 45 and 47 work in cylinders 40, 42, 44 and 46 respectively, and can be provided with conventional piston rings not shown. Structure which operatively connects each piston to drive rotor 28 and shaft 36 in the direction of arrow 48 is identical, except as noted hereinafter. A description of such structure for one piston will impart an understanding of all to extent of their identity.

In FIGURES 1 and 3, opposite ends of a wrist pin 50 are rigidly secured to piston 47. The central portion of wrist pin 50 is rotatably received in the radially outer end of a radially extending piston rod 52. The radially inner end of piston rod 52 is rotatably mounted on throw 54 of crankshaft 56. Throw 54 is disposed radially inwardly of piston 47, and comprises a short shaft length radially offset from the longitudinal axis of crankshaft 56. When the engine is operating, throw 54 describes a circle of rotation about the crankshaft axis. Crankshaft 56 extends longitudinally relative to rotor 28, and has an end portion 58 rotatably mounted in a bearing in rotor end wall 32. The other end portion 60 of crankshaft 56 is rotatably mounted in a bearing in rotor end wall 34. End portion 60 projects through end wall 34. A planetary gear 62 is fixedly secured to the end portion 60 outside rotor end wall 34. Thus crankshaft end portion 60 forms a gear shaft, although it will be apparent that a separate gear shaft could be provided, fixed to and axially aligned with crankshaft 56.

Engine 14 includes four crankshafts 56, 64, 66 and 68 (FIGURE 1), each crankshaft driving a planetary gear 62, 65, 67 and 69 respectively (FIGURE 7). The crankshafts and planetary gears are arranged at 90° intervals around the rotor axis. The planet gears are of the same size, and mesh with a sun gear 70 which is fixed on housing end wall 22. Sun gear 70 has a central axis coincident with the axis of drive shaft 36. A central cavity in sun gear 70 rotatably receives drive shaft 36, which projects through housing end wall 22. Sun gear 70, being disposed between the planetary gears, has an outer surface having teeth meshing with the teeth of the planetary gears. The gear ratio of the sun to each planet gear is 2:1.

Housing wall 18 defines a working space for the rotor, and substantial quadrants of wall 18 define intake, compression, combustion and exhaust regions within the working space. These regions are generally indicated at 72, 74, 76, and 78, respectively. A plurality of slots 80 in housing side wall 18 form a passage communicating an intake manifold 82 with intake region 72. Charge passed through intake slots 80 is compressed between a piston and housing wall 18 in compression region 74, and is ignited by a spark plug 84 mounted on housing wall 18 in combustion region 76. A plurality of exhaust slots 86 in housing wall 18 form a passage communicating an exhaust manifold 88 with exhaust region 78. The intake, compression, combustion and exhaust regions are thus serially arranged, circumferentially around the rotor.

A ring gear 90 (FIGURE 3) is fixed to rotor end wall 34, circumscribing end wall 34 adjacent rotor side wall 30. An internal starter pinion 92 is fixed on a shaft 94 which is rotatably mounted in a bearing in housing end wall 22. Shaft 94 is operatively connected in a conventional manner to a starter motor not shown. To start the engine, the starter motor is operated to drive starter pinion 92, which drives ring gear 90 to rotate rotor 28 and shaft 36. After engine 14 is started, operation of the starter motor is discontinued and starter pinion 92 idles as the rotor is rotated by its pistons.

Operation of engine 14, to the extent thus far described, will now be discussed. Rotation of rotor 14 is initiated by starter pinion 92. A charge mixture of fuel and air is passed into intake manifold 82 and intake slots 80. As will be discussed in detail hereinafter, the cylinders and crankshaft throws are positioned so that one of the pistons simultaneously enters the intake, compression, combustion and exhaust regions with each of one pair of opposite pistons simultaneously disposed at the top of a stroke, while each of the other pair of opposite pistons is at the bottom of a stroke. Thus, in FIGURE 1, piston 45 is at the top of its exhaust stroke, entering intake region 72. Piston 47 is at the bottom of its intake stroke as it passes from intake region 72 to compression region 74. Piston 41 is at the top of its compression stroke, entering combustion region 76. Piston 43 is at the bottom of its power stroke and entering exhaust region 78.

Assuming that cylinder 40 has received charge in intake region 72, and that piston 41 compressed the charge in compression region 74, the compressed charge is fired by spark plug 84. This drives piston 41 inwardly, thereby forcing the throw of crankshaft 64 inwardly, in a clockwise direction about the axis of crankshaft 64 as viewed in FIGURE 1. This rotates crankshaft 64 in a clockwise direction, thereby rotating the end portion of the crankshaft which serves as a gear shaft for planetary gear 65 (FIGURE 7). Rotation of the gear shaft would rotate planet 65, if the planet were free to rotate. But the teeth of planetary gear 65 mesh with the teeth of fixed sun gear 70, so the planet cannot rotate about its own axis, but rather, rolls around the sun gear in the direction of arrow 48. This applies rotative force to rotor 28 through the planetary gear shaft which is received in rotor end wall 34. This rotative force causes the rotor to rotate about its axis, and since the rotor end walls are fixed to drive shaft 36, shaft 36 rotates about the same axis.

Power is thus transmitted from the rod of piston 41 to rotor 28 to rotate the rotor with reciprocation of the piston. As rotor 28 is rotated by planet 65, the other planets 62, 69 and 67 are carried around the sun gear by action of the rotor on the respective gear shafts, thereby rotating the associated crankshaft and throws and forcing the other pistons through exhaust, intake and compression strokes, respectively. As piston 41 is driven inwardly by combustion of the charge, piston 43 is moved outwardly to exhaust, piston 45 is moved inwardly to take in charge, and piston 47 is moved outwardly to compress charge against housing wall 18. When piston 47 rotates to the position of piston 41 in FIGURE 1, the compressed charge is fired and the action described in connection with the firing of piston 41 is repeated. This will be repeated again and again as pistons 45 and 43 successively rotate to firing position, whereafter piston 41 will again be advanced to firing position and the rotor cycle is repeated.

The throw of each crankshaft is disposed so that its longitudinal axis is in coplanar relationship with the axes of its crankshaft and rotor 28, with the throw and rotor axes on opposite sides of the crankshaft axis, when the associated piston is in firing position adjacent the spark plug. This assures that the piston will be at the top of its compression stroke at firing. The throws of 180° opposite crankshafts are positioned so that when the piston associated with one of the crankshafts is in firing position, the axes of the throw and crankshaft associated with the other piston are in coplanar relationship with the rotor axis and with the axes of the throw and crankshaft of the one piston, with the axis of the crankshaft of the other piston being positioned between the rotor axis and the axis of its throw. Therefore, when one piston is at the top of its compression stroke in firing position, the 180° opposite piston is at the top of its exhaust stroke, as can be seen from the relative positions of pistons 41 and 45 in FIGURE 1, where the axes of rotor 28, of crankshafts 64 and 68, and the throws of those crankshafts, are all in coplanar relationship. The throws of crankshafts 64, 68 are at outermost positions on their circle of rotation about the crankshaft axes, relative to the axis of rotor 28. At the same time, pistons 43, 47 are at the bottom of their power and intake strokes, respectively, with the axes of their associated throws and crankshafts, and the axis of rotor 28, being in coplanar relationship, with the axes of the throws being positioned between the axes of their respective crankshaft and the rotor axis. The throws of crankshafts 56, 66 are thus disposed at innermost positions on their circles of rotation about their respective crankshaft axes relative to the rotor axis.

Figure 5:
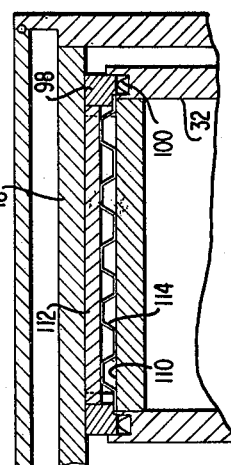
FIGURE 5 is a sectional view on line 5—5 of FIGURE 4.

The combustion areas at the heads of the pistons are sealed from other combustion areas and from ambient by a unique combination of sealing rings and strips. Two annular grooves 96 (FIGURE 3) are formed in rotor side wall 30, adjacent the rotor end walls. An annular sealing ring 98 is sealably received in each groove (see also FIGURES 4, 5). Springs 100 in the grooves below rings 98 urge the rings radially outwardly into rotatable, sealed relationship with housing side wall 18. Each ring 98 is splint (FIGURE 4), having overlapping, rabbeted ends 102, 104. End 102 has a generally Z-shaped projecting tongue 106 which is received in a complementary Z-shaped groove in end 104 (see also FIGURE 6). This structure effectively provides a gas-tight joint between the ends of each ring 98.

Each ring 98 has a plurality of longitudinally extending, semi-circular projections 108 (FIGURE 4) spaced around the periphery of the rotor. The semi-circular projections 108 are received in complementary recesses in rotor wall 30. Projections 108 prevent annular slippage of rings 98 around the rotor.

Rotor side wall 30 includes longitudinal grooves 110 (FIGURES 4, 5) disposed on each side of each cylinder aperature 38. An elongated sealing strip 112 is received in each groove 110. Springs 114 received in grooves 110 below strips 112 yieldably urge the strips radially outwardly to make slidable, sealed engagement with housing side wall 18. Longitudinal ends of strips 112 are tightly received in slots in projections 108, to form a gas-tight joint.

Rotor end wall 32 includes a hub 114 (FIGURE 1) which is fixed to drive shaft 36. Four spokes 116 extend radially outwardly from the hub and connect the hub to a circular rim 118 which is rigidly secured to rotor side wall 30. The crankshafts are rotatably received in spokes 116.

An oil spray nozzle 120 (FIGURE 3) carried by housing end wall 20 sprays a cooling flow of lubricant through the apertures between spokes 116 onto the cylinders as the rotor rotates, thereby providing effective cooling to the cylinders. Nozzle 120 is disposed opposite the radial inner end of the cylinder side walls, so that oil for lubrication of the pistons in the cylinders is applied by the spray, in addition to oil applied to the outside of the cylinders for cooling purposes. Oil applied to the outside of the cylinder walls drains, and is thrown by centrifugal force, to the inside of rotor side wall 30, and flows through drain orifices 122 in rotor end walls 32, 34 to the bottom of housing 16. Oil from housing 16 passes through conduits 124, 126 to a conduit 128 which conducts the oil to a reservoir 130 (FIGURE 2). A pump 132 forces oil from reservoir 130 through an oil supply passageway 134 to spray nozzle 120. A conventional oil relief valve 136 is located in supply passageway 134. A cooling coil 138 cools oil in reservoir 130.

Additional cooling is provided by water flowing through coolant chamber 24 (FIGURE 1). The cooling water is supplied to coolant chamber 24 through a conduit 140, flows through the chamber from top to bottom, in heat exchange relationship with housing sidewall 18, and passes through water drain conduit 142. Water from drain conduit 142 passes through a radiator 144 (FIGURE 2), where the water is cooled. Part of the cooled water returns to water supply conduit 140. The remainder passes to cooling coils 138 in oil reservoir 130. Water emerging from cooling coils 138 is recycled through radiator 144 through conduit 146.

Oil for lubrication of the various moving parts in engine 14 is delivered from supply passageway 134 through bores in the shafts, rotor, and connecting parts. A supply of oil is maintained in oil pan 148, which is secured to housing end wall 22 (FIGURE 3). The oil in pan 148 lubricates the planetary gears as the planets revolve about the axis of the rotor and dip into the oil pan. Sun gear 70 is lubricated from the planets.

Figure 8:
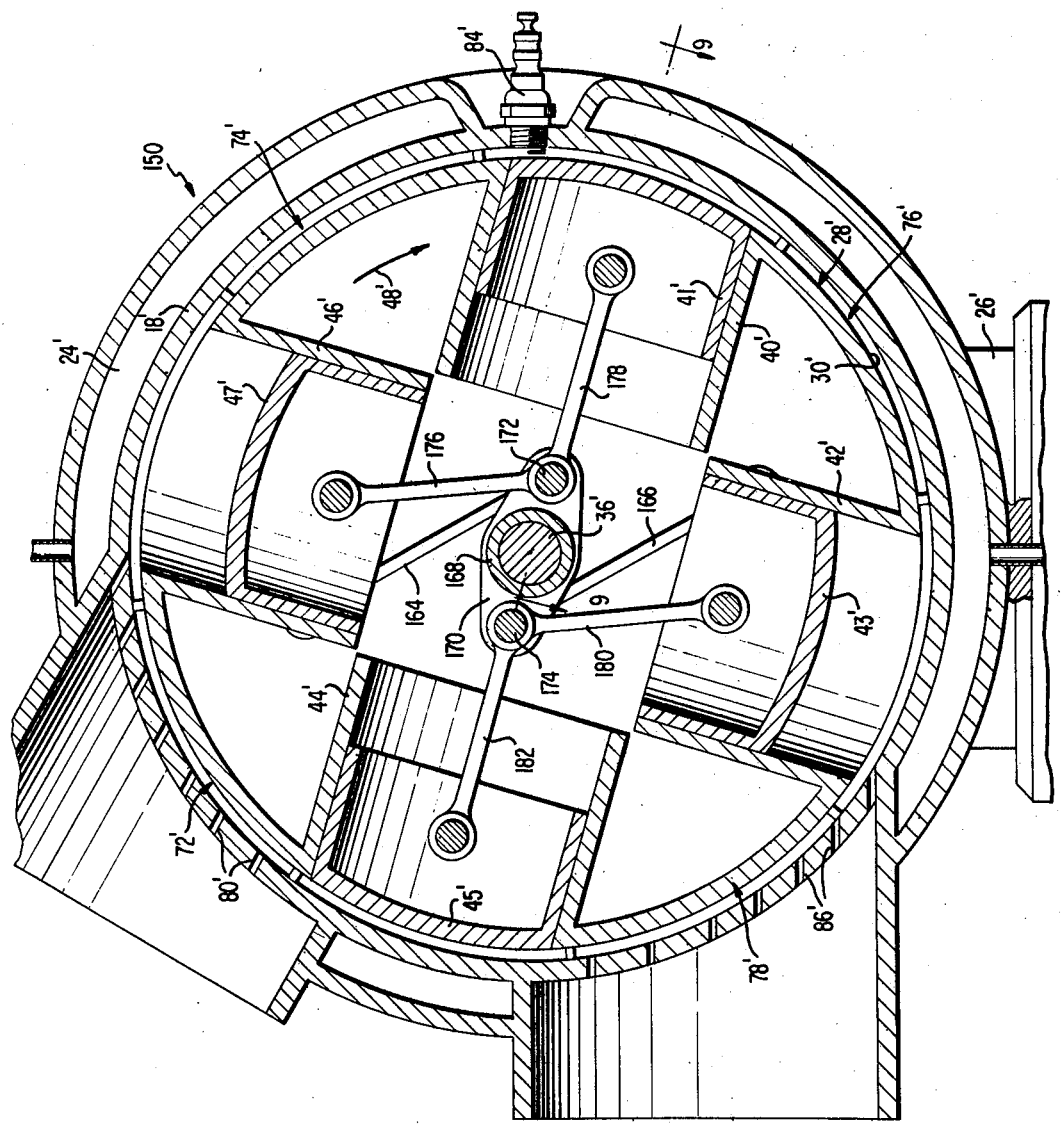
FIGURE 8 is a side view in vertical cross section of another engine embodying the principles of the invention.

FIGURE 8 depicts another rotary engine, generally indicated at 150 and embodying the principles of the invention. Much of the structure of engine 150 is similar to that of previously described engine 14, and primed reference numerals indicate similar parts. Engine 150 differs from engine 14 in the power transmission between piston rods and sun gear.

Figure 11:
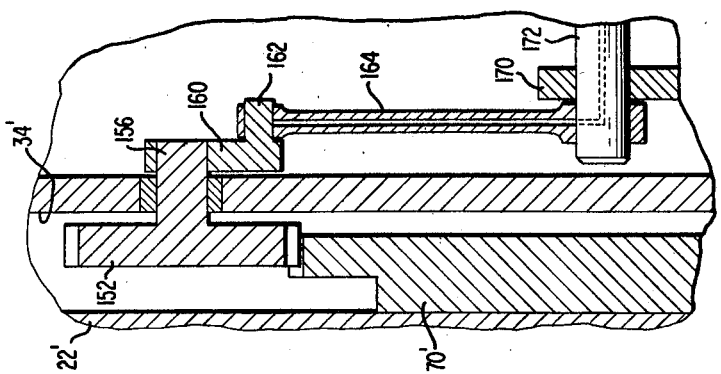
FIGURE 11 is a detail view on section line 11—11 of FIGURE 10.
Figure 10:
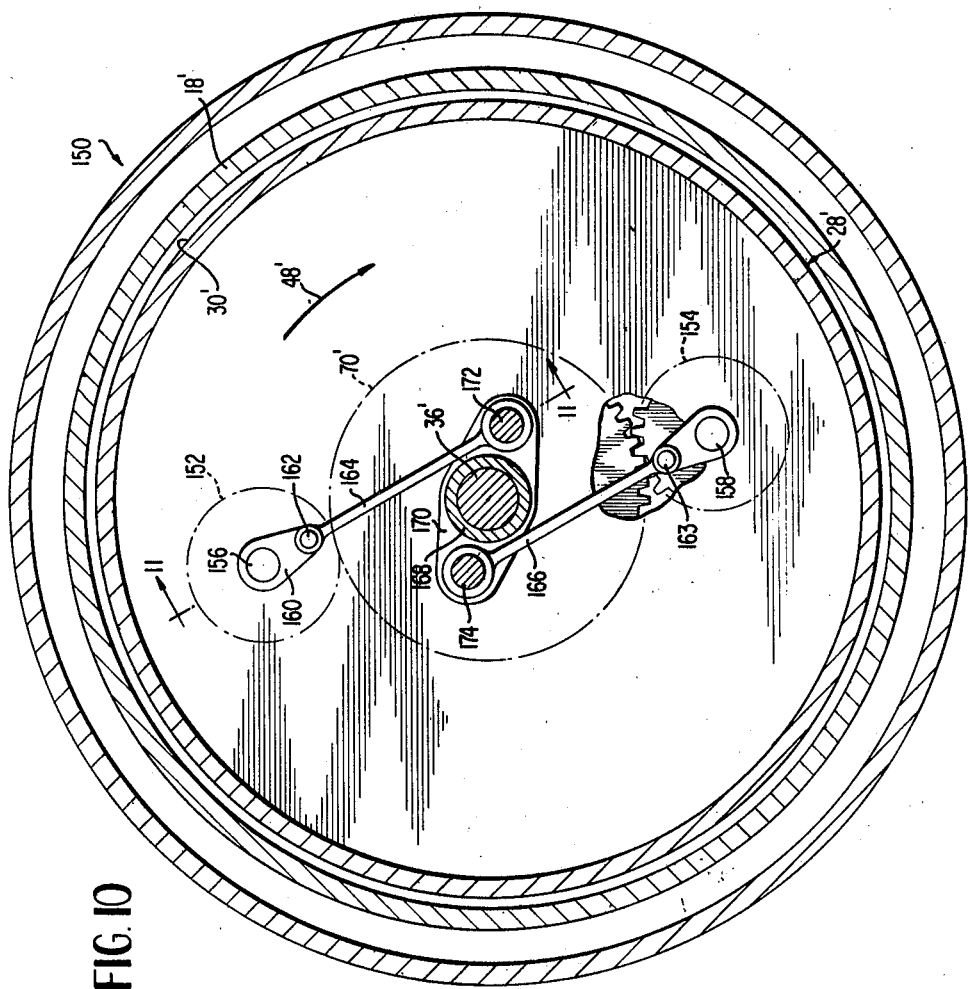
FIGURE 10 is another side sectional view of the engine of FIGURE 8, showing details with cylinders and pistons removed.

In engine 150, only two planetary gears 152, 154 (FIGURE 10) are employed, spaced 180° apart around the axis of rotor 28'. Planets 152, 154 are fixed to gear shafts 156, 158, respectively, which are rotatably mounted in rotor end wall 34' (FIGURE 11). A support 160 is rigidly secured to gear shaft 156 and has a projection 162 located eccentrically relative to gear shaft 156. A similar eccentric 163 (FIGURE 10) is fixed to gear shaft 158.

Figure 9:
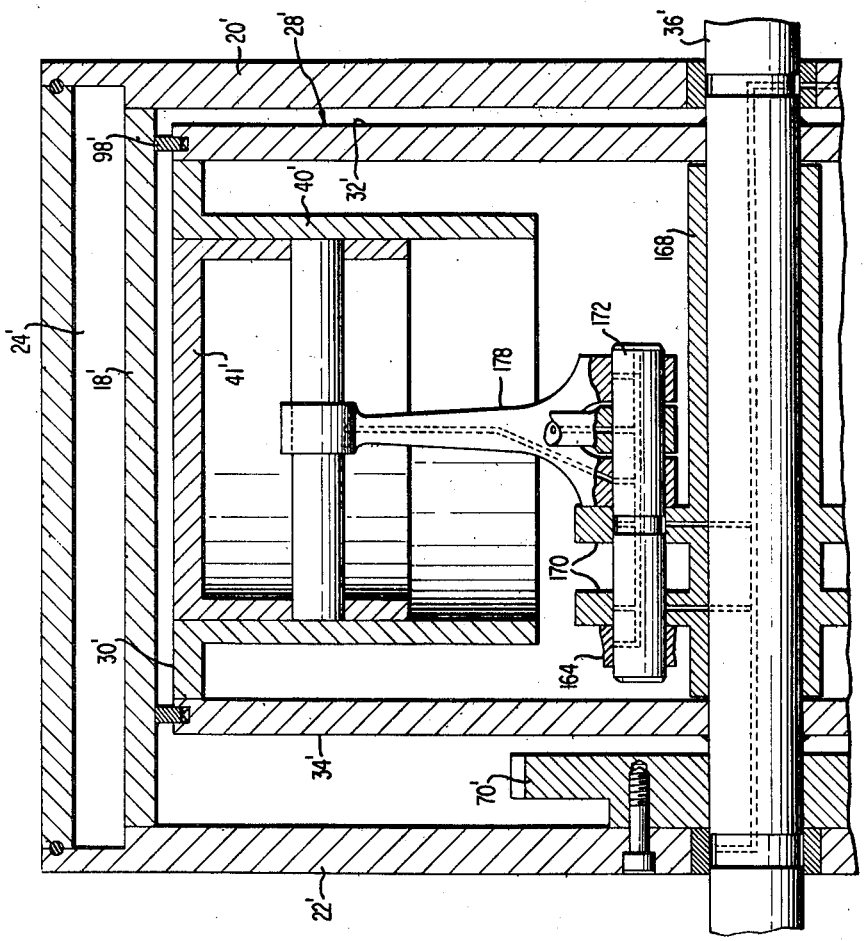
FIG. 9 is a cross-sectional view on line 9—9 of FIGURE 8.

Radially outer ends of connecting rods 164, 166 are rotatably mounted on eccentrics 162, 163, respectively. Connecting rods 164, 166 extend inwardly from the eccentrics toward the central region of rotor 28' and have radially inner ends located adjacent driveshaft 36'. A connecting member 168 (see also FIGURE 8) is rotatably mounted on drive shaft 36', and includes a plurality of radially outwardly projecting lugs 170. (See also FIGURE 9.) Two crank pins 172, 174 (FIGURE 8) are fixedly mounted in lugs 170. The crank pins extend longitudinally relative to the rotor axis and are spaced 180° apart about the axis of the rotor. The radially inner ends of connecting rods 164, 166 are rotatably mounted on crank pins 172, 174, respectively.

The piston rods of two adjacent pistons are rotatably mounted on each crank pin. Thus, piston rod 176 of piston 47' and piston rod 178 of piston 41' are mounted on crank pin 172. Piston rod 180 of piston 43', and piston rod 182 of piston 45', are mounted on crank pin 174.

The pistons are spaced at 90° intervals around the rotor axis, and one simultaneously enters each of intake, compression, combustion and exhaust regions. In FIGURE 8, piston 41' is at the top of its compression stroke and entering combustion region 76', piston 43' is at the bottom of its power stroke and entering exhaust region 78', piston 45' is at the top of its exhaust stroke, entering intake region 72', and piston 47' is at the bottom of its intake stroke and entering compression region 74'. At this point in the cycle, the axes of crank pins 172, 174, rotor 28', and the wrist pins of piston 41' and 45' are in coplanar relationship. The axes of wrist pins of piston 43' and 47', and rotor 28' are also in coplanar relationship, in a plane normal to the plane of the axes of the crank pins and wrist pins of pistons 41', 45'.

Figure 12A:
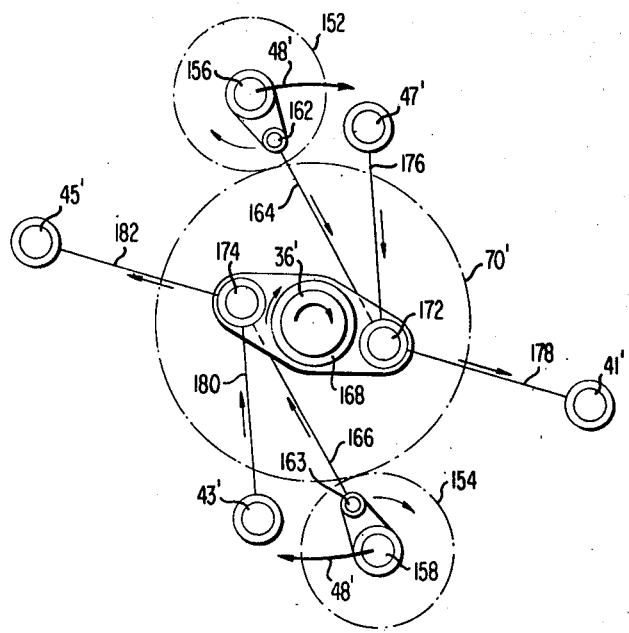
FIGURES 12a, b and c schematically illustrates operation of the engine of FIGURE 8.

Operation of engine 150 will be described in connection with FIGURES 12a, b and c, wherein the reference numerals of the pistons have been assigned to their respective wrist pins. Discussion will be initiated with the engine started, and with the rotor in the position illustrated in FIGURE 8, which position is schematically depicted in FIGURE 12a. Starting can be effected by the ring gear arrangement described in engine 14.

In FIGURE 12a, piston 41' has been rotated to firing position. Piston 43' is at the bottom of its power stroke. As piston 43' fired, it drove its piston rod 180 inwardly as shown by the directional arrow. Piston rod 180 applied force through crank pin 174 to connector 168, and thereby rotating connector 168 clockwise relative to shaft 36' (as viewed in FIGURE 12a). Such rotation of connector 168 forced connecting rods 164, 166 inwardly relative to rotor 28', thereby moving each eccentric 162, 163 inwardly relative to the rotor, in an arc about the axis of its respective gear shaft 156, 158. Such movement of the eccentrics applies rotative force to the planet gear shafts, thereby applying rotative force to planets 152, 154. This force would rotate the planets if the planets were free to rotate, but since the planets mesh with fixed sun gear 70', the planets roll around the sun gear in the direction of arrows 48'. This applies rotative force to the rotor end wall in which the gear shafts are mounted, and rotates the rotor about its axis. Since drive shaft 36' is fixed to rotor 28', the shaft also rotates.

It will be observed that in engine 150, the firing of one piston drives two planetary gears, through rigid connector 168. Every power stroke delivers power to both planets to rotate rotor 28, and also drives the other three pistons through exhaust, intake and compression strokes in the respective regions. In FIGURE 12a, the driving of connector 168 clockwise by piston rod 180 has driven piston rod 182 of piston 45' outwardly through its exhaust stroke. On the opposite side of shaft 36', the movement of connector 168 clockwise relative to shaft 36' has drawn piston rod 176 of piston 47' inwardly to the bottom of its intake stroke. This same action has also driven piston rod 178 of piston 41' outwardly through its compression stroke to firing position.

Figure 12B:
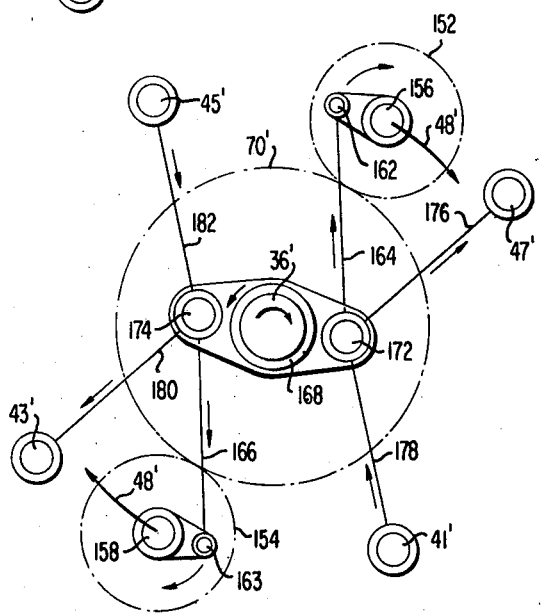

When piston 41' fires (FIGURE 12b) piston rod 178 is driven inwardly, thereby rotating connector 168 counterclockwise relative to shaft 36', in effect, pivoting connector 168 about the axis of shaft 36'. This drives connecting rod 164 outwardly, rotating gear shaft 156 and causing planet 152 to roll around sun gear 70' and apply rotative force to the rotor and drive shaft through gear shaft 156. At the same time, connecting rod 166 is driven outwardly, delivering power to planet 154. While driving connecting rods 164, 166, piston rod 178 also drives the other three piston rods through their respective strokes. Thus, rod 176 of piston 47' is driven outwardly through a compression stroke, and through connector 168, rod 182' of piston 45' is driven inwardly through an intake stroke, and rod 180 of piston 43' is driven outwardly in an exhaust stroke.

Figure 12C:
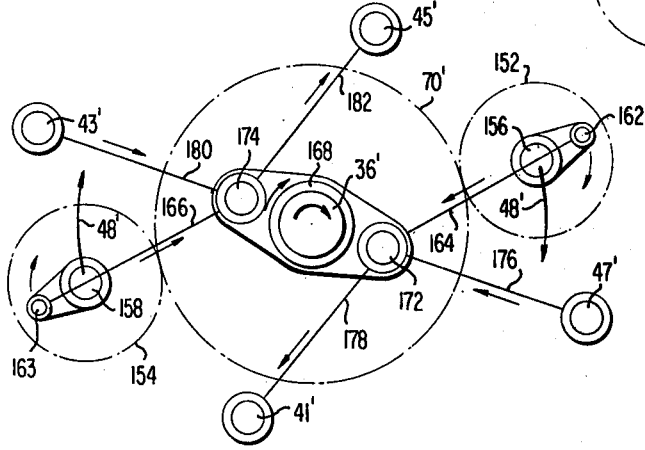

FIGURE 12c depicts the relative position of the parts with piston 41' at the bottom of its power stroke and piston 47' in firing position. Piston 47' acts in the same fashion as piston 43' upon firing in that it pivots connector 168 clockwise about the axis of shaft 36'. Thus piston rod 176 is driven inwardly, rotating connector 168 clockwise, thereby pulling connecting rod 164 inwardly and causing planet 152 to roll around sun gear 70'. At the same time, through connector 168, connecting rod 166 is pulled inwardly, delivering power to planet 154 to rotate the rotor. Movement of piston rod 176 inwardly also moves connecting rod 178 outwardly, thereby forcing piston 41' through its exhaust stroke. Through connector 168, piston rod 180 of piston 43' is pulled inwardly through an intake stroke, and piston rod 182 of piston 45' is forced outwardly through a compression stroke. When piston 45' reaches the top of its compression stroke and advances to firing position, it fires and acts in the same fashion as piston 41', in rotating connector 168 counterclockwise relative to shaft 36'. This advances piston 43' again to firing position.

Rotary internal combustion engines according to the invention are highly advantageous. They can be entirely fabricated structures, requiring no cast blocks or intricate machining thereof. Each piston fires once in every revolution of the rotor, delivering a relatively high power output at low speeds and providing a high horsepower-to-weight ratio. Low speeds reduce wear on parts and increase service life. Cooling and sealing problems of prior art rotary engines have been overcome by simple, reliable expedients. The engines are versatile, having the capability of burning fuels other than gasoline. For example, if it is desired to operate on diesel fuel, a fuel injector can be employed as an igniting device.

The invention has been described in connection with two embodiments, which are set forth for purposes of illustration only. Modifications of the illustrated embodiments can be made without departing from the principles of the invention.

I claim:
1. A rotary internal combustion engine, comprising
a stationary housing having a continuous side wall,
an annular rotor rotatably mounted in the housing and having a rigid continuous peripheral side wall opposing the side wall of the housing, the rotor also having opposite end walls,
the side wall of the housing including means defining intake, compression, combustion and exhaust regions disposed serially in a direction around the periphery of the rotor,
a main drive shaft fixed to the rotor,
means defining a plurality of peripherally spaced-apart coplanar cylinders rigidly positioned relative to the side wall of the rotor and extending radially inwardly from the side wall of the rotor,
a radially reciprocable piston disposed in each cylinder,
the cylinders being positioned for simultaneous entry of one of the pistons into each of the intake compression, combustion and exhaust regions,
a piston rod connected to each piston and extending inwardly from each piston,
a plurality of gear shafts mounted in a rotor end wall,
a planetary gear fixed on each gear shaft,
a sun gear fixed on the housing between the planetary gears and including a radially outer surface having teeth meshing with teeth of the planetary gears, and connecting means connecting the piston rods with the gear shafts to apply rotative force to the planetary gears upon reciprocation of the pistons, for reaction of the planetary gears against the sun gear to rotate the rotor and the main drive shaft.

2. The engine of claim 1, the main drive shaft extending longitudinally through the rotor and being fixed to the end walls of the rotor.

3. The engine of claim 2,
the sun gear including a body and means defining a central cavity in the body,
the main drive shaft being rotatably received in the cavity in the body.

4. The engine of claim 1,
each gear shaft having a longitudinal axis,
the connecting means including a crankshaft extending longitudinally relative to each gear shaft,
each crankshaft having one end portion fixedly associated with a gear shaft and another end portion rotatably mounted in a rotor end wall,
each crankshaft also having a throw disposed radially inwardly of each piston, and
means rotatably mounting each piston rod on a throw.

5. The engine of claim 4,
the housing including means defining an intake passage communicating with the intake region, and means defining an exhaust passage communicating with the exhaust region,
the engine including an igniting device mounted on the housing in the combustion region,
the plurality of cylinders consisting of four cylinders,
the rotor, crankshafts and throws having longitudinal axes,
the cylinders, pistons and crankshafts being disposed at 90° intervals around the longitudinal axis of the rotor,
the axes of the throws of 180° opposite crankshafts being disposed in coplanar relationship with the axes of the respective crankshafts and with the axis of the rotor, with the crankshaft axes being positioned between the axis of the rotor and the axes of the respective throws, when one of the associated pistons is rotated to a firing position adjacent the igniting device, and
the axes of the throws of 180° opposite crankshafts being disposed in coplanar relationship with the axes of the respective crankshafts and the axis of the rotor, with the axes of the throws being positioned between the rotor axis and the axes of the respective crankshafts, when one of the associated pistons is 90° from the firing position,
whereby power from a piston in the combustion region drives the other three pistons through exhaust, intake and compression strokes in the respective regions.

6. The engine of claim 1,
the main drive shaft extending longitudinally through the rotor and being fixed to the end walls of the rotor,
the housing including means defining an intake passage communicating with the intake region, and means defining an exhaust passage communicating with the exhaust region,
the engine including an igniting device mounted on the housing in the combustion region,
the rotor having a longitudinal axis,
the plurality of cylinders consisting of four cylinders disposed at 90° intervals around the longitudinal axis of the rotor,
the plurality of gear shafts consisting of two gear shafts spaced 180° apart around the longitudinal axis of the rotor,
each gear shaft having a longitudinal axis,
the connecting means including an eccentric member fixed to each gear shaft at a location spaced from the longitudinal axis of the gear shaft,
a connecting rod having an outer end portion rotatably mounted on each eccentric member and extending to an inner end portion adjacent the main drive shaft,
a connecting member rotatably mounted on the main drive shaft and including outwardly projecting lug members,
a pair of crank pins carried by the lug members,
the crank pins being spaced 180° apart about the longitudinal axis of the rotor,
means rotatably mounting the inner end portion of each connecting rod on a crank pin, and
means rotatably mounting the piston rods of two adjacent pistons on each crank pin, whereby power from a piston in the combustion region drives both planetary gears and drives the other three pistons through exhaust intake and compression cycles in the respective regions.

7. The engine of claim 1,
the side wall of the rotor including means defining annular grooves extending peripherally around the rotor adjacent each end wall of the rotor,
the engine including an annular sealing ring disposed in each annular groove and means urging the sealing ring radially outwardly into rotatable, sealed relationship with the side wall of the housing,
the side wall of the rotor including means defining an elongated groove extending longitudinally along the rotor on each side of each aperture,
the engine including sealing strips disposed in each elongated groove and means urging the strips radially outwardly into slideable sealed relationship with the side wall of the housing,
each annular sealing ring including at least one longitudinal projection,
the peripheral wall of the rotor including means forming recesses for receiving the projections.

8. The engine of claim 7,
each annular sealing ring including a plurality of peripherally spaced-apart longitudinal projections,
the sealing strips having ends,
each projection including means defining a slot sealably receiving the end of a sealing strip.

9. The engine of claim 1,
the side wall of the rotor including means defining annular grooves extending peripherally around the rotor adjacent each end wall of the rotor,
the engine including an annular sealing ring disposed in each annular groove and means urging the sealing ring radially outwardly into rotatable, sealed relationship with the side wall of the housing,
each annular sealing ring having rabbeted, overlapping end portions,
one end portion having a longitudinally extending, generally Z-shaped tongue member,
the other end portion including means defining a groove for receiving the tongue member.

10. The engine of claim 1, including
a ring gear secured to and circumscribing a rotor end wall adjacent the peripheral side wall of the rotor,
a starter pinion disposed radially inwardly of the ring gear and meshing with the ring gear, and
means for operatively connecting the starter pinion to a starter motor.

11. A rotary internal combustion engine, comprising
a housing having a continuous side wall,
a rotor rotatably mounted in the housing and having a peripheral side wall opposing the side wall of the housing,
the rotor also having opposite end walls,
a main drive shaft fixed to the rotor,
a plurality of cylinders carried by rotor,
a reciprocable piston disposed in each cylinder,
power transmitting means for transmitting power from the pistons to rotate the rotor,
at least one of the end walls of the rotor including means defining a plurality of apertures, and
spraying means carried by the housing for spraying cooling liquid lubricant through the apertures onto the cylinders.

12. The engine of claim 1,
the cylinders having inner ends, and
the spraying means including nozzle means disposed opposite the inner ends of the cylinders,
whereby a portion of the lubricant lubricates the pistons in the cylinders.

13. The engine of claim 11,
at least one of the end walls of the rotor including means defining a lubricant drain passage adjacent the peripheral wall of the rotor,
the engine including a lubricant reservoir,
mean forming a passageway communicating the lubricant drain passage with the reservoir,
means for cooling lubricant in the reservoir,
means forming a supply passageway communicating the spraying means with the reservoir, and
means for pumping lubricant through the supply passageway from the reservoir to the spraying means.

14. The engine of claim 11, including means forming a coolant chamber in heat exchange relationship with the side wall of the housing.

15. The engine of claim 11,
the power transmitting means including
a planetary gear fixed on each gear shaft,
a plurality of gear shafts mounted in a rotor end wall,
a sun gear fixed on the housing between the planetary gears and meshing with the planetary gears,
a crankshaft extending longitudinally relative to each gear shaft,
each crankshaft having one end portion fixedly associated with a gear shaft and another end portion rotatably mounted in a rotor end wall,
each crankshaft also having a throw, and
means mounting each piston on a throw.

16. The engine of claim 11,
the main drive shaft extending longitudinally through the rotor and being fixed to the end walls of the rotor,
the rotor having a longitudinal axis,
the plurality of cylinders consisting of four cylinders disposed at 90° intervals around the longitudinal axis of the rotor,
the power transmitting means including
a pair of gear shafts mounted in a rotor end wall and spaced 180° apart around the longitudinal axis of the rotor,
each gear shaft having a longitudinal axis,
a planetary gear fixed on each gear shaft,
a sun gear fixed on the housing between the planetary gears and meshing with the planetary gears,
an eccentric member fixed to each gear shaft at a location spaced from the longitudinal axis of the gear shaft,
a connecting rod having an outer end portion rotatably mounted on each eccentric member and extending to an inner end portion adjacent the main drive shaft,
a connecting member rotatably mounted on the main drive shaft and including outwardly projecting lug members,
a pair of crank pins carried by the lug members, the crank pins being spaced 180° apart about the longitudinal axis of the rotor,
means rotatably mounting the inner end portion of each connecting rod on a crank pin, and
means mounting two adjacent pistons on each crank pin.

References Cited

UNITED STATES PATENTS

| | | |
|---|---|---|
| 1,138,388 | 5/1915 | Levering. |
| 1,157,811 | 10/1915 | Shannon. |
| 1,272,791 | 7/1918 | Freer. |
| 1,394,587 | 10/1921 | Stewart. |
| 2,990,820 | 7/1961 | Saijo. |
| 3,200,797 | 8/1965 | Dillenberg. |
| 3,292,603 | 12/1966 | Wayto. |

MARK M. NEWMAN, Primary Examiner

DOUGLAS HART, Assistant Examiner

PO-1050
(5/69)

UNITED STATES PATENT OFFICE
CERTIFICATE OF CORRECTION

Patent No. 3,499,424          Dated April 10, 1970

Inventor(s) Joe G. Rich

It is certified that error appears in the above-identified patent and that said Letters Patent are hereby corrected as shown below:

Col. 1, line 16, "spring" should be --spray--.

Col. 3, line 68, "crankshaft" should be --crankshafts--.

Col. 4, line 49, "splint" should be --split--.

Col. 4, line 63, "aperature" should be --aperture--.

Col. 9, line 3, before "intake" insert -- , --.

Col. 10, line 4, "mean" should be --means--.

Col. 10, lines 11, 12 and 13: the present recitation of "means forming a coolant chamber in heat exchange relationship with the side wall of the housing." constitutes a separate paragraph and should be inserted paragraphically after "14. The engine of claim 11, including" in line 11.

Col. 10, lines 17, 18: the present recitation of "a plurality of gear shafts mounted in a rotor end wall," should be transferred to a location between lines 15 and 16.

SIGNED AND
SEALED
AUG 11 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,499,424  Dated April 10, 1970

Inventor(s) Joe G. Rich

It is certified that error appears in the above-identified patent and that said Letters Patent are hereby corrected as shown below:

Column 9, line 67, "1" should be --11--

Signed and sealed this 4th day of January 1972.

(SEAL)
Attest:

EDWARD M. FLETCHER, JR.  ROBERT GOTTSCHALK
Attesting Officer  Acting Commissioner of Patents